(12) United States Patent
Sohn et al.

(10) Patent No.: US 8,380,212 B2
(45) Date of Patent: Feb. 19, 2013

(54) APPARATUS AND METHOD FOR TRANSMISSION OF DYNAMIC FEEDBACK CHANNEL INFORMATION IN A MIMO SYSTEM

(75) Inventors: Ill Soo Sohn, Seoul (KR); Kwang Bok Lee, Seoul (KR); Chang Soon Park, Chungju-si (KR); Sung Jin Kim, Suwon-si (KR)

(73) Assignees: Samsung Electronics Co., Ltd., Suwon-Si (KR); SNU R&DB Foundation, Seoul (KR)

( * ) Notice: Subject to any disclaimer, the term of this patent is extended or adjusted under 35 U.S.C. 154(b) by 778 days.

(21) Appl. No.: 12/404,243

(22) Filed: Mar. 13, 2009

(65) Prior Publication Data

US 2010/0093361 A1      Apr. 15, 2010

(30) Foreign Application Priority Data

Oct. 13, 2008  (KR) .................. 10-2008-0100077

(51) Int. Cl.
*H04B 7/00* (2006.01)
*H04W 72/00* (2009.01)
*H04W 4/00* (2009.01)
*H04J 11/00* (2006.01)
*H04K 1/10* (2006.01)
*H04L 1/02* (2006.01)
*H04L 27/00* (2006.01)

(52) U.S. Cl. .......... 455/450; 455/69; 370/208; 370/328; 370/329; 375/260; 375/267; 375/299; 375/316

(58) Field of Classification Search .................. 455/403, 455/422.1, 423, 450, 452.1, 452.2, 561, 562.1, 455/69; 370/208, 230, 232, 267, 341–344, 370/347, 437, 458, 478, 480–481, 484, 536, 370/310.2, 322, 332–337, 328–329; 375/240.02, 375/240.03, 242–254, 260, 267, 299, 316
See application file for complete search history.

(56) References Cited

U.S. PATENT DOCUMENTS 7,362,822 B2 *  4/2008  Li et al. .................. 375/299

(Continued)

FOREIGN PATENT DOCUMENTS

KR  10-2007-0091402   9/2007
KR  10-2007-0119178  12/2007

OTHER PUBLICATIONS

Randa Zakhour et al., "Adaptive Feedback Rate Control in MIMO Broadcast System," IEEE Pub. No. 978-1-4244-2271-5/08, 2008, pp. 440-444.

*Primary Examiner* — Dwayne Bost
*Assistant Examiner* — Scott Trandai
(74) *Attorney, Agent, or Firm* — NSIP Law

(57) ABSTRACT

A base station apparatus and method of transmission of dynamic feedback channel information in a MIMO system. The base station apparatus includes a first channel state information receiving unit to receive a first channel state information; a receiving terminal selection unit to select at least one receiving terminal to receive data from among a plurality of terminals; a quantization length determination unit to independently determine a second quantization length of the selected receiving terminal; a quantization length transmission unit to transmit the second quantization length to the selected e receiving terminal; a second channel state information receiving unit to receive second channel state information from the selected receiving terminal; and a data transmission unit to transmit data to the selected receiving terminal using a plurality of transmission antennas of a base station based on the second channel state information.

27 Claims, 7 Drawing Sheets

U.S. PATENT DOCUMENTS

| | | | |
|---|---|---|---|
| 7,539,253 B2 * | 5/2009 | Li et al. | 375/260 |
| 7,702,029 B2 * | 4/2010 | Kotecha et al. | 375/267 |
| 7,769,390 B2 * | 8/2010 | Kim et al. | 455/452.2 |
| 7,778,826 B2 * | 8/2010 | Lin et al. | 704/223 |
| 7,899,405 B2 * | 3/2011 | Han et al. | 455/69 |
| 7,907,911 B2 * | 3/2011 | Alexiou et al. | 370/329 |
| 7,933,357 B2 * | 4/2011 | Mazzarese et al. | 375/299 |
| 7,933,560 B2 * | 4/2011 | Han et al. | 455/69 |
| 2003/0036359 A1 * | 2/2003 | Dent et al. | 455/63 |
| 2003/0125040 A1 * | 7/2003 | Walton et al. | 455/454 |
| 2005/0043031 A1 * | 2/2005 | Cho et al. | 455/450 |
| 2005/0265223 A1 * | 12/2005 | Song | 370/208 |
| 2007/0064632 A1 * | 3/2007 | Zheng et al. | 370/281 |
| 2007/0064829 A1 | 3/2007 | Zheng | |
| 2007/0066237 A1 | 3/2007 | Zhang | |
| 2007/0098106 A1 * | 5/2007 | Khojastepour et al. | 375/267 |
| 2007/0153731 A1 * | 7/2007 | Fine | 370/329 |
| 2007/0195811 A1 * | 8/2007 | Basson et al. | 370/441 |
| 2007/0206697 A1 * | 9/2007 | Qiu et al. | 375/267 |
| 2007/0218917 A1 * | 9/2007 | Frederiksen et al. | 455/450 |
| 2007/0242770 A1 * | 10/2007 | Kim et al. | 375/267 |
| 2007/0280116 A1 | 12/2007 | Wang et al. | |
| 2008/0159425 A1 * | 7/2008 | Khojastepour et al. | 375/260 |
| 2008/0292012 A1 * | 11/2008 | Kim et al. | 375/260 |
| 2009/0005028 A1 * | 1/2009 | Haimovich et al. | 455/423 |
| 2009/0010215 A1 * | 1/2009 | Kim et al. | 370/329 |
| 2009/0016460 A1 * | 1/2009 | Hwang et al. | 375/267 |
| 2009/0067512 A1 * | 3/2009 | Mielczarek et al. | 375/245 |
| 2009/0104926 A1 * | 4/2009 | Suh et al. | 455/513 |
| 2009/0190528 A1 * | 7/2009 | Chung et al. | 370/328 |
| 2009/0201861 A1 * | 8/2009 | Kotecha | 370/329 |
| 2009/0238297 A1 * | 9/2009 | Zhang et al. | 375/267 |
| 2009/0274230 A1 * | 11/2009 | Heath et al. | 375/260 |
| 2010/0002797 A1 * | 1/2010 | Sanayei | 375/267 |
| 2010/0046402 A1 * | 2/2010 | Forck et al. | 370/280 |
| 2010/0048232 A1 * | 2/2010 | Hwang et al. | 455/501 |
| 2010/0093362 A1 * | 4/2010 | Aiba | 455/450 |
| 2010/0151871 A1 * | 6/2010 | Zhang et al. | 455/450 |
| 2010/0158146 A1 * | 6/2010 | Hamaguchi et al. | 375/260 |
| 2010/0202553 A1 * | 8/2010 | Kotecha et al. | 375/267 |
| 2011/0222473 A1 * | 9/2011 | Breit et al. | 370/328 |

* cited by examiner

APPARATUS AND METHOD FOR TRANSMISSION OF DYNAMIC FEEDBACK CHANNEL INFORMATION IN A MIMO SYSTEM

CROSS-REFERENCE TO RELATED APPLICATION

This application claims the benefit under 35 U.S.C. §119 (a) of a Korean Patent Application No. 10-2008-0100077, filed Oct. 13, 2008, in the Korean Intellectual Property Office, the entire disclosure of which is incorporated herein by reference.

BACKGROUND

1. Field

The following description relates to transmission in a multiple-input multiple-output (MIMO) antenna system. More particularly, the description relates to an apparatus and method of transmission of dynamic feedback channel information in a MIMO system.

2. Description of Related Art

A multiple input multiple output (MIMO) antenna system is a system where a plurality of antennas are located in a transmitter and each antenna independently transmits information to a receiver. Such systems are referred to as a MIMO system or a space division multiplexing (SDM) system. The MIMO antenna system is a system which utilizes a spatial area to enable high speed data transmission in limited frequency environments. According to research results to date, it is known that a channel capacity of the MIMO system increases proportionally to an increase in a number of transmission antennas and receiving antennas in the system.

A MIMO system having multiple users requires scheduling that enables multiple users to simultaneously communicate and is highly complex because each user's quality of service (QoS) requirements are considered. Recently, research regarding scheduling for multiple users, optimization for transmission/reception, and a feedback signal was conducted in the field of the MIMO systems.

An example of a conventional feedback scheme in the MIMO system is a method which notifies signal to interference and noise ratio (SINR) of each stream that can be received in a receiver. This method, however, can be considered ineffective because it wastes wireless resources. An example of another conventional method is a partial feedback method. In the partial feedback method, as a size of a code book is increased, more accurate channel state information may be fed back. This method is not desirable, however, because the feedback information is increased.

SUMMARY

In one general aspect, a base station apparatus for a base station in a wireless communications system includes a first channel state information receiving unit to receive a first channel state information from a plurality of terminals regarding a wireless channel between the base station apparatus and the plurality of terminals connected to the base station apparatus, wherein the first channel state information is quantized based on a first quantization length; a receiving terminal selection unit to select at least one receiving terminal to receive data from among the plurality of terminals based on the first channel state information; a quantization length determination unit to independently determine a second quantization length of the selected receiving terminal based on the first channel state information; a quantization length transmission unit to transmit the second quantization length to the selected receiving terminal, wherein the second quantization length corresponds to the selected receiving terminal; a second channel state information receiving unit to receive the second channel state information from the selected receiving terminal, wherein the second channel state information is quantized based on the second quantization length of the wireless channel; and a data transmission unit to transmit data to the selected receiving terminal using a plurality of transmission antennas of the base station based on the second channel state information.

The terminal selection unit may select a plurality of receiving terminals based on a number of the plurality of transmission antennas.

The transmission unit may include a weight vector generation unit to generate a weight vector based on the second channel state information; a transmission data generation unit to generate antenna transmission data by multiplying data to be transmitted to the receiving terminals via each of the plurality of transmission antennas by an element of the weight vector; and an array transmission unit to transmit the antenna transmission data to the selected receiving terminal via each transmission antenna.

The weight vector generation unit may generate the weight vector based on the first channel state information.

The base station apparatus for a base station in a wireless communications system may further include a pilot signal transmission unit to transmit a pilot signal to the selected receiving terminal using each transmission antenna, wherein the first channel state information and the second channel state information are generated based on the pilot signal.

The first channel state information may include at least one of a magnitude information or a directional information of a channel vector with respect to the wireless channel.

The second channel state information may include at least one of a magnitude information or a directional information of a channel vector with respect to the wireless channel.

The quantization length determination unit may determine the second quantization length based on at least one of: a feedback bandwidth allocated to the first channel state information or a feedback bandwidth allocated to the second channel state information; a number of the transmission antennas of the base station apparatus; a number of the plurality of terminals; a transmission power of the base station apparatus; and the first quantization length.

The quantization length determination unit may generate a receiving terminal list which includes an index of the selected receiving terminal and may determine the second quantization length according to:

$$b_i = \frac{1}{\beta}\log_2\left\{\alpha_i \cdot \beta \cdot \left(\frac{1}{v} - \frac{1}{\beta}\right)\right\}$$

wherein $b_i$ is a second quantization length of an ith receiving terminal;

$\alpha_i$ is determined as:

$$\alpha_i = \frac{P}{M}\|h_i\|^2 \cdot 2^{-\frac{b}{M-1}}$$

where P is a transmission power of the base station, M is the number of transmission antennas of the base station apparatus, $h_i$ is a wireless channel vector from the transmission antenna of the base station apparatus to the ith receiving terminal, and $\overline{b}$ is a first quantization length;

$\beta$ is determined as:

$$\beta = \frac{1}{M-1};$$

and v is determined as:

$$v = \left(\left(\frac{2^{\beta \cdot (B-K\cdot \overline{b})}}{\beta^{|S_n|} \cdot \prod_{i \in S_n} \alpha_i}\right)^{1/|S_n|} + \frac{1}{\beta}\right)^{-1}$$

where B is a total sum of the first quantization length and the second quantization length, $S_n$ is a receiving terminal list, and K is the number of the plurality of terminals connected with the base station apparatus.

In yet another general aspect, a terminal includes a first channel state information transmission unit to transmit a first channel state information to a base station regarding a wireless channel between the base station and the terminal, wherein the first channel state information is quantized based on a first quantization length; a quantization length receiving unit to receive a second quantization length from the base station, wherein the second quantization length is determined based on the first channel state information; a second channel state information transmission unit to transmit a second channel state information of the wireless channel to the base station, wherein the second channel state information is quantized with the second quantization length; and a data receiving unit to receive data from the base station transmitted based on the second channel state information.

The first channel state information may include at least one of a magnitude information or a directional information of a channel vector with respect to the wireless channel.

The second channel station information may include at least one of magnitude information or directional information of a channel vector with respect to the wireless channel.

In yet another general aspect, a data transmission method of transmitting data to wireless terminals from a base station includes receiving a first channel state information from a plurality of terminals regarding a wireless channel between the base station and a plurality of terminals connected to the base station, wherein the first channel state information is quantized based on a first quantization length; selecting, by the base station, a plurality of receiving terminals to receive data from among the plurality of terminals based on the first channel state information; independently determining, by the base station, a second quantization length of the receiving terminals based on the first channel state information; transmitting from the base station to the receiving terminals the second quantization length which corresponds to the receiving terminals; receiving, by the base station, the second channel state information from the receiving terminals, wherein the second channel state information is quantized into the second quantization length of the wireless channel; and transmitting data from the base station to the receiving terminals using a plurality of transmission antennas based on the second channel state information.

The transmitting of the data may include generating, by a weight vector generation unit, a weight vector based on the second channel state information; generating, by a transmission data generation unit, antenna transmission data by multiplying data to be transmitted to the receiving terminals via each of the plurality of transmission antennas by an element of the weight vector; and transmitting, by an array transmission unit, the antenna transmission data to the receiving terminals via each transmission antenna.

The generating the weight vector may include generating the weight vector based on the first channel state information.

Independently determining the second quantization length may include determining the second quantization length based on at least one of a feedback bandwidth allocated to the first channel state information or a feedback bandwidth allocated to the second channel state information, the number of transmission antennas of the base station, the number of the plurality of terminals, a transmission power of the base station, and the first quantization length.

The data transmission method of transmitting data to wireless terminals from a base station also may include generating, by a quantization length determination unit, a receiving terminal list that includes an index of the receiving terminals and determines a slack variable v according to:

$$v = \left(\left(\frac{2^{\beta \cdot (B-K\cdot \overline{b})}}{\beta^{|S_n|} \cdot \prod_{i \in S_n} \alpha_i}\right)^{1/|S_n|} + \frac{1}{\beta}\right)^{-1}$$

where B is a total sum of a first quantization length and a second quantization length, $S_n$ is the receiving terminal list, K is a number of the plurality of terminals connected with the base station, and $\overline{b}$ is the first quantization length, $\alpha_i$ is determined as:

$$\alpha_i = \frac{P}{M} \|h_i\|^2 \cdot 2^{-\frac{\overline{b}}{M-1}}$$

where P is a transmission power of the base station, M is a number of transmission antennas of the base station, $h_i$ is a wireless channel vector from the transmission antennas of the base station to an ith receiving terminal, $\beta$ is determined as:

$$\beta = \frac{1}{M-1}$$

wherein independently determining the second quantization length includes determining the second quantization length according to:

$$b_i = \frac{1}{\beta} \log_2 \left\{\alpha_i \cdot \beta \cdot \left(\frac{1}{v} - \frac{1}{\beta}\right)\right\}$$

where $b_i$ is the second quantization length of the ith receiving terminal.

In another general aspect, a data transmission method of transmitting data to wireless terminals from a base station may further include determining a specific second quantization length as "0" when the specific second quantization length is equal to or less than "0" from among the independently determined second quantization lengths; and removing a receiving terminal which corresponds to the predetermined second quantization length from the receiving terminal list.

In another general aspect, a computer-readable recording medium storing a program configured to cause a base station to receive a first channel state information from a plurality of terminals regarding a wireless channel between the base station and a plurality of terminals connected to the base station, wherein the first channel state information is quantized based on a first quantization length; select at least one receiving terminal to receive data from among the plurality of terminals based on the first channel state information; independently determine a second quantization length of the selected receiving terminal based on the first channel state information; to transmit from the base station to the selected receiving terminal the second quantization length which corresponds to the selected receiving terminal; to receive the second channel state information from the receiving terminal, wherein the second channel state information is quantized into the second quantization length of the wireless channel; and to transmit data from the base station to the selected receiving terminal using a plurality of transmission antennas based on the second channel state information.

Other features will become apparent to those skilled in the art from the following detailed description, which, taken in conjunction with the attached drawings, discloses exemplary embodiments.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
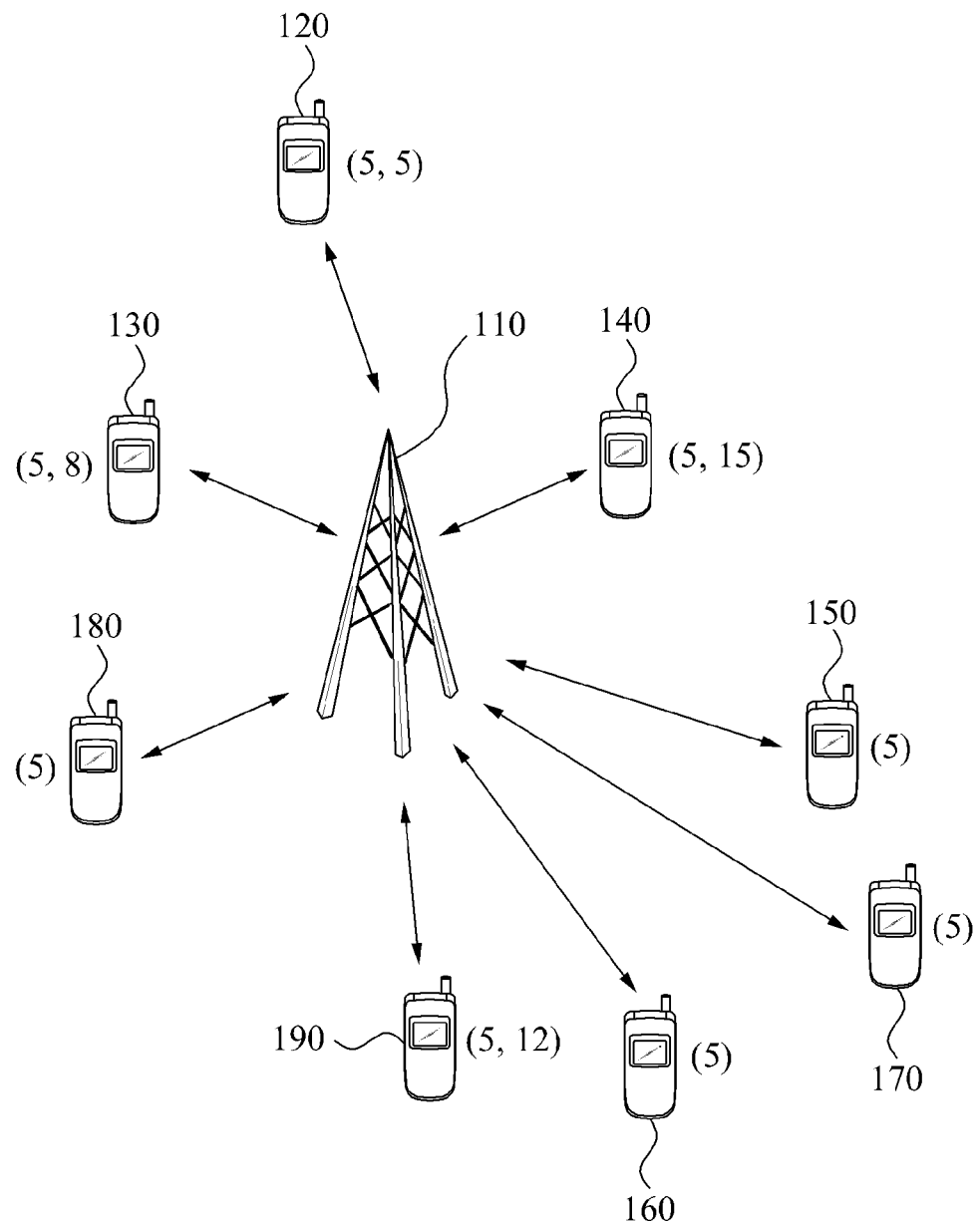
FIG. 1 is a diagram illustrating transmission of dynamic channel information in an exemplary MIMO wireless communication system.

FIG. 1 is a diagram illustrating transmission of dynamic channel information in an exemplary MIMO wireless communication system. A plurality of terminals 120, 130, 140, 150, 160, 170, 180, and 190 may transmit channel information to a base station apparatus 110. The channel information may include wireless channel information from the base station apparatus 110 to each terminal 120, 130, 140, 150, 160, 170, 180, and 190.

Each terminal 120, 130, 140, 150, 160, 170, 180, and 190 may quantize a channel state information and transmit the quantized channel state information to the base station apparatus 110. Each terminal 120, 130, 140, 150, 160, 170, 180, and 190 may quantize the channel state information of each wireless channel based on a first quantization length and may transmit the quantized channel state information to the base station apparatus 110. In FIG. 1, for example, the first quantization length may be determined to be identical for each terminal 120, 130, 140, 150, 160, 170, 180, and 190. It may be assumed in FIG. 1 that the channel state information quantized based on the first quantization length is a first channel state information. In FIG. 1, as an example, a quantization length of 5 bits is determined for each terminal 120, 130, 140, 150, 160, 170, 180, and 190.

In the MIMO system of FIG. 1, a plurality of receiving terminals 120, 130, 140, and 190 may be selected by the base station apparatus 110 to receive data from the base station apparatus 110. The base station apparatus 110 may evaluate a wireless channel state from the base station apparatus 110 to each terminal 120, 130, 140, 150, 160, 170, 180, and 190. The base station apparatus 110 may select terminals, for example, the receiving terminals 120, 130, 140, and 190, according to the first channel state.

The base station apparatus 110 may independently determine a second quantization length with respect to each receiving terminal 120, 130, 140, and 190. The second quantization length determined for the receiving terminal 120 and the second quantization length determined for the receiving terminal 130 may differ from each other. In FIG. 1, for example, quantization lengths of 5 bits for the receiving terminal 120, 8 bits for the receiving terminal 130, 15 bits for the receiving terminal 140, and 12 bits for the receiving terminal 190 are determined by the base station apparatus 110.

The base station apparatus 110 may transmit the second quantization length to each receiving terminal 120, 130, 140, and 190, and each receiving terminal 120, 130, 140, and 190 may quantize the channel state information according to the second quantization length. In FIG. 1 it may be assumed that the second quantization length is a second channel state information. Each receiving terminal 120, 130, 140, and 190 may transmit the second channel state information to the base station apparatus 110.

In the MIMO system, the number of terminals capable of transmitting data to the base station apparatus 110 is limited by the selection made by the base station apparatus 110. When a channel state from the base station apparatus 110 to a specific terminal is inadequate, such a terminal would have a low probability to be selected as a receiving terminal. Therefore, it may be a waste of wireless resources for all terminals to transmit channel state information to the base station apparatus 110.

In addition, each receiving terminal 120, 130, 140, and 190 may be required to transmit wireless channel information to the base station apparatus 110 so that each receiving terminal 120, 130, 140, and 190 may receive information from the base station apparatus 110. As the wireless channel information transmitted from each receiving terminal 120, 130, 140, and 190 to the base station apparatus 110 becomes more accurate, the base station apparatus 110 may transmit data more effectively.

When all terminals 120, 130, 140, 150, 160, 170, 180, and 190 transmit channel state information to the base station apparatus 110, an amount of channel state information transmitted from each receiving terminal 120, 130, 140, and 190 is limited. When only receiving terminals 120, 130, 140, and 190 transmit the channel state information, a greater amount of channel state information may be transmitted to the base station apparatus 110.

In FIG. 1 each terminal 120, 130, 140, 150, 160, 170, 180, and 190 may be connected to the base station apparatus 110 and the base station apparatus 110 may receive the first channel state information from each terminal 120, 130, 140, 150, 160, 170, 180, and 190. In FIG. 1, for example, if each terminal 120, 130, 140, 150, 160, 170, 180, and 190 transmits the first channel state of 5 bits, the base station apparatus 110 may receive a maximum of 40 bits of first channel information. In this example, the first quantization length is 5 bits, and the total sum of the first quantization lengths assigned for the base station apparatus 110 is 40 bits. The base station apparatus 110 may select four receiving terminals 120, 130, 140, and 190 based on the first channel state. Also, the base station apparatus 110 may independently determine a second quantization length with respect to each receiving terminals 120, 130, 140, and 190. In FIG. 1, for example, 5 bits, 8 bits, 15 bits, and 12 bits of second quantization lengths are determined, respectively, for each receiving terminal 120, 130, 140, and 190. A total sum of the second quantization lengths allocated to the base station apparatus 110 is 40 bits. Although the total sum of the first quantization lengths and the second quantization lengths is identical in this example, a total sum of the first quantization lengths and the second quantization lengths may not be identical. The second channel state information transmitted from the receiving terminals 120, 130, 140, and 190 may contain more detailed information than the first channel state information. The base station apparatus 110 may transmit data more effectively based on the second channel state information. In FIG. 1, according to this example, the total sum of the first quantization lengths and the second quantization lengths is 80 bits.

In FIG. 1, the base station apparatus 110 may allocate a different feedback bandwidth according to the first channel state information and the second channel state information. The plurality of terminals 120, 130, 140, 150, 160, 170, 180, and 190 may each transmit the first channel state information to the base station apparatus 110 using the feedback bandwidth allocated to the first channel state information. Each receiving terminal 120, 130, 140, and 190 may transmit the second channel state information to the base station apparatus 110 using the feedback bandwidth allocated to the second channel state information.

In FIG. 1, for example, the base station apparatus 110 may determine the second quantization length based on the feedback bandwidth allocated to the first channel state information or to the second channel state information. When the feedback bandwidth allocated to the second channel state information is narrow, the base station apparatus 110 may determine the second quantization lengths with respect to each receiving terminal 120, 130, 140, and 190 so that a total sum of the second quantization lengths is shorter. In addition, the base station apparatus 110 may reselect terminals to receive data for each receiving terminal 120, 130, 140, and 190.

Figure 2:
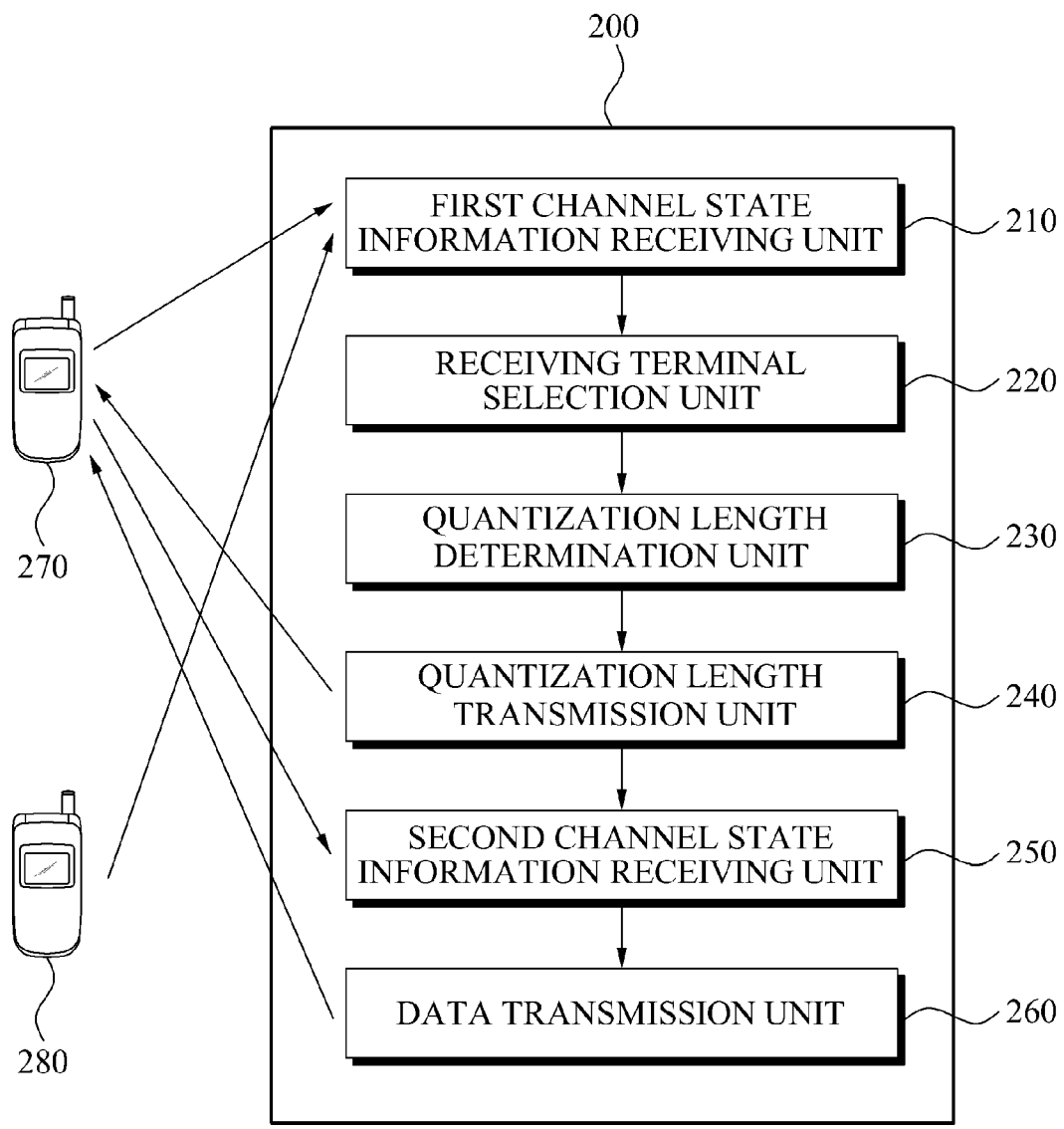
FIG. 2 is a block diagram illustrating an exemplary base station.

FIG. 2 is a block diagram illustrating an exemplary base station apparatus 200. The base station apparatus 200 includes a first channel state receiving unit 210, a receiving terminal selection unit 220, a quantization length determination unit 230, a quantization length transmission unit 240, a second channel state receiving unit 250, and a data transmission unit 260. The first channel state information receiving unit 210 receives the first channel state information from a plurality of terminals 270 and 280. The terminals 270 and 280 may quantize channel state information of a wireless channel from the base station apparatus 200 to the plurality of terminals 270 and 280, based on a first quantization length. In FIG. 2, for example, the first quantization length may be determined to be identical for each terminal 270 and 280.

The receiving terminal selection unit 230 may select at least one data receiving terminal 270 from among the plurality of terminals 270 and 280 based on the first channel state information. The receiving terminal selection unit 220 may select a terminal whose wireless channel state is superior as the receiving terminal 270.

The quantization length determination unit 230 may independently determine a second quantization length for the receiving terminals 270 and 280 using the first channel state information. The quantization length determination unit 230 may determine the second quantization length based on at least one of: the feedback bandwidth allocated to the base station apparatus 200, a number of transmission antennas of the base station apparatus 200, a number of the plurality of terminals connected to the base station apparatus 200, a transmission power of the base station apparatus 200, and the first quantization length.

The quantization length transmission unit 240 may transmit the second quantization length determined with respect to receiving terminal 270 to corresponding receiving terminals.

The second channel state information receiving unit 250 may receive the second channel state information, which may be quantized based on the second quantization length of the wireless channel, from the base station apparatus 200 to receiving terminal 270.

The data transmission unit 260 may transmit data to the receiving terminals 270 and 280 using a plurality of transmission antennas based on the second channel state information. The second quantization length may be determined to be longer than the first quantization length. When the second quantization length is longer than the first quantization length, the second channel state may contain more detailed information than the first channel state. The data transmission unit 260 may more effectively transmit data to the receiving terminals 270 and 280 by using more detailed information of the wireless channel.

The data transmission unit 260 may transmit data to a plurality of receiving antennas using the plurality of transmission antennas. When a number of the receiving terminals is less than or equal to a number of the transmission antennas, the data transmission unit 260 may transmit data to the plurality of receiving terminals with high efficiency. Consequently, the receiving terminal selection unit 220 may consider the number of the plurality of transmission antennas when selecting the number of receiving terminals.

The base station apparatus 200 may further include a pilot signal transmission unit which transmits pilot signals to receiving terminals using the plurality of transmission antennas. Each terminal 270 and 280 may estimate wireless channels, from the base station apparatus 200 to each terminal 270 and 280, based on the pilot signals. The first channel state information and the second channel state information transmitted from the terminals 270 and 280 may be generated based on the pilot signals transmitted from the pilot signal transmission unit.

The quantization length determination unit 230 may generate a receiving terminal list that may include an index for the receiving terminals 270 and 280 and determine the second quantization length according to Equation 1 below.

$$b_i = \frac{1}{\beta}\log_2\left\{\alpha_i \cdot \beta \cdot \left(\frac{1}{v} - \frac{1}{\beta}\right)\right\}$$ Equation 1

In Equation 1, $b_i$ represents a second quantization length for an ith receiving terminal, $\alpha_i$ is determined according to Equation 2 below, $\beta$ is determined according to Equation 3 below, and v is determined according to Equation 4 below.

$$\alpha_i = \frac{P}{M}\|h_i\|^2 \cdot 2^{-\frac{\overline{b}}{M-1}}$$ Equation 2

In Equation 2, P represents a transmission power of the base station apparatus, M represents a number of transmission antennas of the base station apparatus, $h_i$ represents a wireless channel vector from transmission antennas of the base station apparatus to the ith receiving terminal, and $\overline{b}$ represents a first quantization length.

$$\beta = \frac{1}{M-1}$$ Equation 3

$$v = \left(\left(\frac{2^{\beta(B-K\cdot\overline{b})}}{\beta^{|S_n|} \cdot \prod_{i \in S_n} \alpha_i}\right)^{1/|S_n|} + \frac{1}{\beta}\right)^{-1}$$ Equation 4

In Equation 4, B represents a total sum of the first quantization length and a second quantization length, $S_n$ represents a receiving terminal list, K represents a number of a plurality of terminals connected to the base station apparatus, $|S_n|$ represents a size of the receiving terminal list $S_n$ and refers to a number of an index included in the receiving terminal list.

The second quantization length for the ith receiving terminal, $b_i$, as derived by Equation 1, may result in a negative value. However, $b_i$ represents the second quantization length, and a negative value of $b_i$ would be inappropriate. In such a case, the quantization length determination unit 230 may determine the second quantization length $b_i$ to be "0" and update the receiving terminal list $S_n$ corresponding to the second quantization length $b_i$ so that the ith receiving terminal may be deleted from the receiving terminal list $S_n$. In this case, $|S_n|$ which represents the size of the receiving terminal list $S_n$ is decreased by factor means multiple of "1." The quantization length determination unit 230 may re-determine a second quantization bit $b_i$ with respect to each receiving terminal included in the receiving terminal list $S_n$ using the updated receiving terminal list $S_n$.

Figure 3:
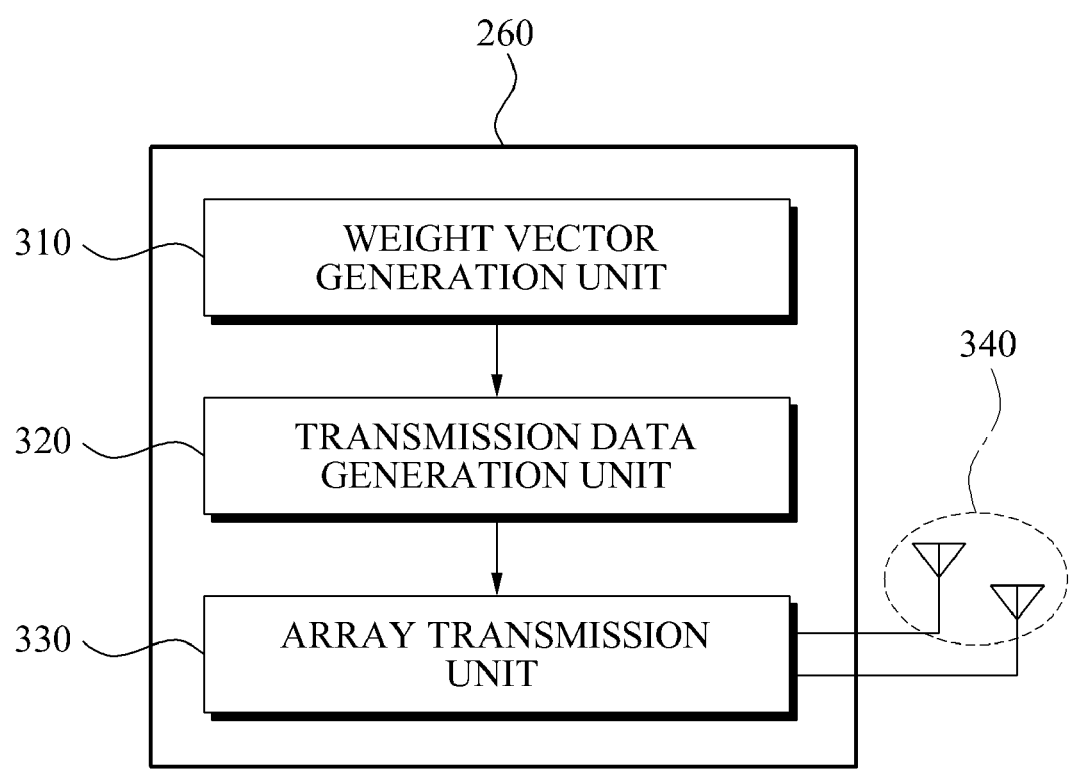
FIG. 3 is a diagram illustrating an exemplary data transmission unit of FIG. 2.

FIG. 3 is a diagram illustrating an exemplary data transmission unit. The data transmission unit 260 may include a weight vector generation unit 310, a receiving data generation unit 320, and an array transmission unit 330.

The weight vector generation unit 310 may generate a weight vector based on a second channel state information. The weight vector generation unit 310 may generate the weight vector using a Zero-Forcing method or a Minimum Mean Square Error (MMSE) method. When the transmission unit 260 transmits data to a plurality of receiving terminals using the plurality of transmission antennas 340, wireless channels from a base station apparatus to each receiving terminal may be vector channels having a number of elements matching a number of the plurality of transmission antennas 340. Hereinafter, such vector channels are referred to as "wireless channel vectors." The first channel state information and the second channel state information transmitted from each receiving terminal may also include magnitude information and directional information of the wireless channel vectors. That is, the first channel state information and the second channel state also may be vectors.

The first channel state information and the second channel state information may include the magnitude information or the directional information of the wireless channel vectors. The weight vector generation unit 310 may generate a weight vector based on the first channel state information and the second channel state information. The first channel state information and the second channel state information may be combined to generate an accurate third channel state information for the wireless channel, and may generate the weight vector based on the third channel state information.

The transmission data generation unit 320 may generate antenna transmission data by multiplying data that may be transmitted to the receiving terminals using the plurality of transmission antennas 340 by elements of the weight vectors.

The array transmission unit 330 may transmit the antenna transmission data to the receiving terminals via each of the transmission antennas 340.

When the weight vector generation unit 310 generates weight vectors using the Zero-Forcing method, the array transmission unit 330 may minimize data transmission to a specific direction, and transmit data in the other direction by concentrating an electrical power. The weight vector generation unit 310, based on the channel state information transmitted from the plurality of receiving terminals, may transmit data by concentrating the electrical power to the direction of the first receiving terminal and minimize the data transmission to the direction of the second receiving terminal.

For the first receiving terminal, the weight vector generation unit 310 may generate weight vectors which are orthogonal to the second channel state information. The weight vectors which are orthogonal to the second channel state information transmitted from the second terminal may minimize the data transmission in the direction of the second receiving terminal. An interference effect, which the data transmitted to the first receiving terminal may generate for the second receiving terminal, may be minimized.

The second channel state information may include only the directional information of the wireless channel from the base station to each receiving terminal. When the weight vector generation unit generates weight vectors based only on directions of the wireless channels, the magnitude information of the wireless channel vector is not required. The receiving terminals may effectively utilize a feedback bandwidth by transmitting the second channel state information which includes only the direction of the wireless channel vector.

The first channel state information may exclusively include the magnitude information of the wireless channel vector, and the second channel state information may exclusively include the directional information of the wireless channel vector. The receiving terminal selection unit 220 may select only terminals with a superior channel state as receiving terminals based on the first channel state, and the weight vector generation unit 310 may generate weight vectors based on the second channel state information.

Figure 4:
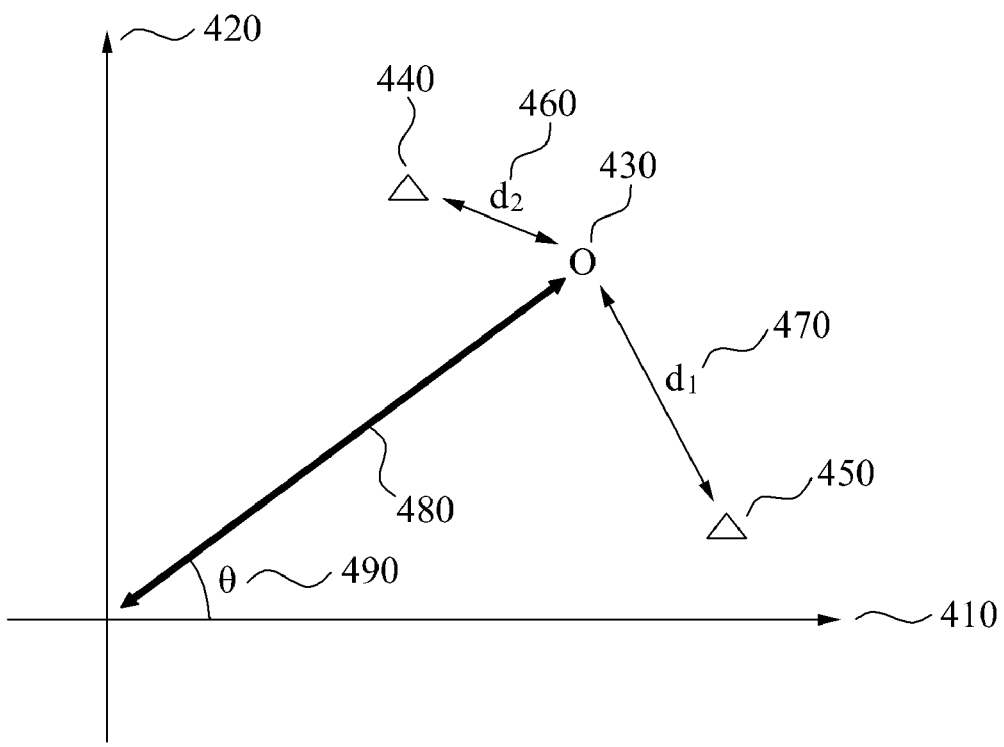
FIG. 4 is a graph illustrating exemplary channel information according.

FIG. 4 is a graph illustrating exemplary channel information. A horizontal axis 410 and a vertical axis 420 represent, respectively, a first element and a second element of a wireless channel vector. In FIG. 4, the graph illustrates an example in which a transmission unit, such as the transmission unit 260 of FIG. 2, is equipped with two transmission antennas and a wireless channel vector that includes only two elements.

A first channel state information 430 may exclusively include rough information regarding a wireless channel vector. In FIG. 4, for example, the first state information may be quantized into 2 bits and the first quantization length may be 2 bits. In this example, the first state information may exclusively include information regarding where the wireless channel vector is located among four areas of a vector plane.

A second channel state information 440 and 450 may include more detailed information regarding the wireless channel information. The second quantization length may be longer than the first quantization length. The second channel state information 440 and 450 may include more detailed information of the wireless channel vector.

In another example, the second channel state information 440 and 450 may include more detailed information of the wireless channel vector using the first channel state information 430. That is, the second channel state information 440 and 450 may exclusively include the information indicating the difference between each first channel state information 430 and each of the wireless channel vectors 460 and 470.

Each of the channel state information 430, 440, and 450 may include magnitude information 480 and directional information 490 of the wireless channel vector.

Figure 5:
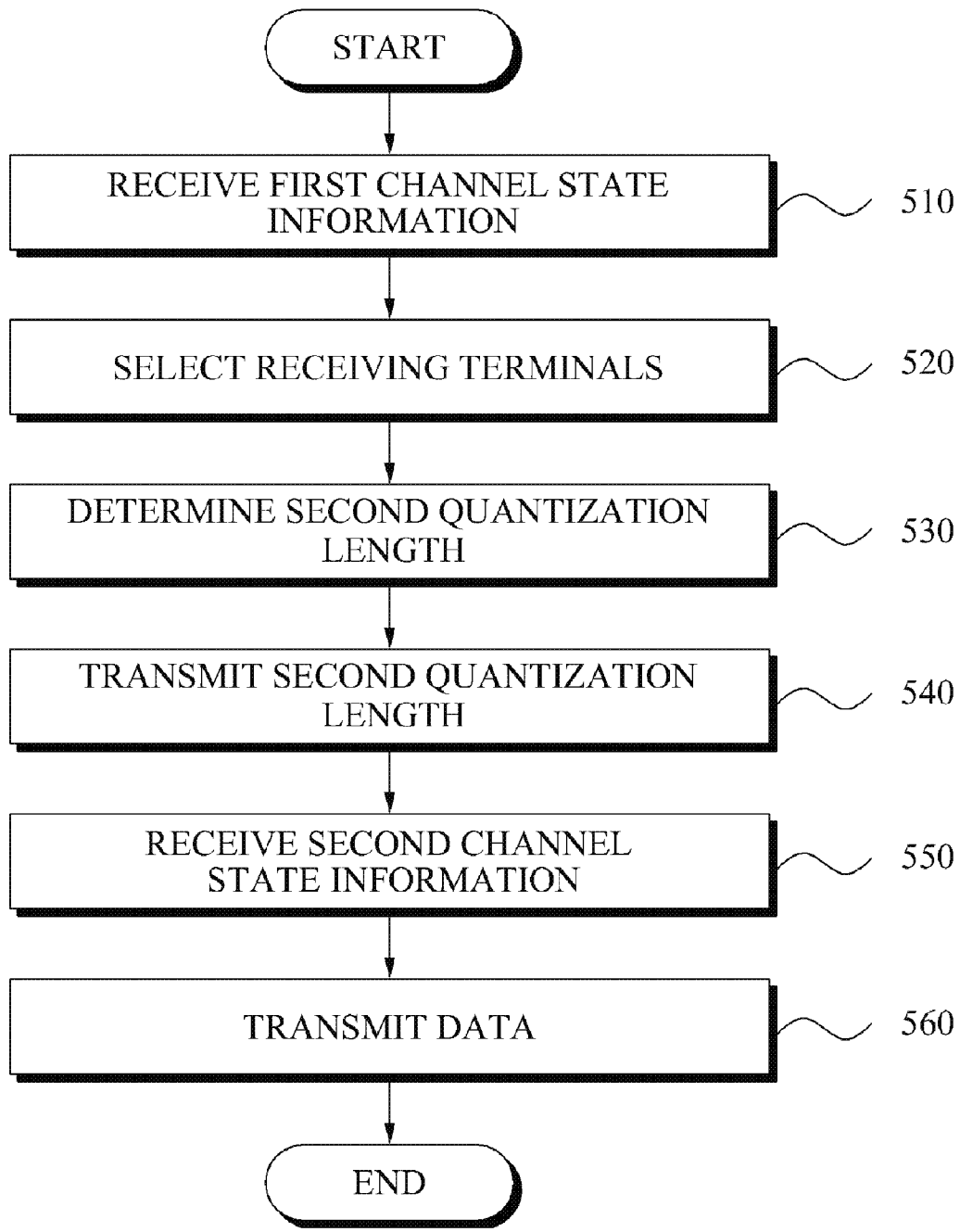
FIG. 5 is a flowchart illustrating a transmission of dynamic channel information in a MIMO wireless communication system according to another exemplary embodiment.

FIG. 5 is a flowchart illustrating exemplary transmission of dynamic channel information in a MIMO wireless communication system. In operation 510, with respect to the wireless channels from a base station apparatus and a plurality of terminals connected to the base station apparatus, the base station apparatus may receive first channel state information that is quantized based on a first quantization length from multiple terminals. The base station apparatus may include a plurality of transmission antennas. In this case, the wireless channels from the base station apparatus to each of the terminals may be vector channels having a number of elements matching a number of transmission antennas of the base station apparatus. A first channel state information may be a vector channel that is quantized based on the first quantization length.

In operation 520, a plurality of receiving terminals to receive data are selected from among the plurality of terminals based on the first channel state information. In the MIMO system, the number of terminals that may be capable of receiving data from the base station apparatus is limited. The base station apparatus may select receiving terminals that have a superior wireless channel state as the plurality of receiving terminals, and may transmit data to the selected receiving terminals. Since a wireless channel state varies over time, the terminals not selected as the receiving terminals may be selected as the receiving terminals when a wireless channel state is improved. In operation 520, the plurality of receiving terminals may be determined based on the number of the plurality of receiving antennas of the base station apparatus.

The base station apparatus may independently determine a second quantization length with respect to each receiving terminal using the first channel state information. The second quantization length may be determined based on a number of transmission antennas of the base station apparatus, the number of the plurality of terminals, a transmission power of the base station apparatus, and the first quantization length.

Operation 530 includes a process of generating a receiving terminal list including indexes for the receiving terminals and a process of calculating a slack variable based on the receiving terminal list. The second quantization length may be determined based on the slack variable. The slack variable may be determined according to Equation 5 below.

$$v = \left( \left( \frac{2^{\beta \cdot (B - K \cdot \overline{b})}}{\beta^{|S_n|} \cdot \prod_{i \in S_n} \alpha_i} \right)^{1/|S_n|} + \frac{1}{\beta} \right)^{-1} \quad \text{Equation 5}$$

In Equation 5 v represents a slack variable, β represents a total sum of a first quantization length and a second quantization length, $S_n$ represents a receiving terminal list, K represents a number of a plurality of terminals connected to a base station apparatus, and $\overline{b}$ represents a first quantization length, $|S_n|$ represents a size of the receiving terminal list $S_n$ and represents a number of an index of the receiving terminals included in the receiving terminal list. Variable $\alpha_i$ is determined in Equation 6 below, and the sum β is determined in Equation 7 below.

$$\alpha_i = \frac{P}{M} \|h_i\|^2 \cdot 2^{-\frac{\overline{b}}{M-1}} \quad \text{Equation 6}$$

$$\beta = \frac{1}{M-1} \quad \text{Equation 7}$$

In Equation 6, P represents a transmission power for the base station apparatus, M represents a number of transmission antennas of the base station apparatus, and $h_i$ represents a wireless channel vector from the transmission antennas of the base station to an ith receiving terminal.

In operation 530, the second quantization length with respect to each receiving terminal may be based on the slack variable and determined by Equation 8 below.

$$b_i = \frac{1}{\beta} \log_2 \left\{ \alpha_i \cdot \beta \cdot \left( \frac{1}{v} - \frac{1}{\beta} \right) \right\} \quad \text{Equation 8}$$

When a specific second quantization length is equal to or less than "0," among the independently calculated second quantization lengths, operation 530 may further include a process of determining a length of such quantization length as "0" and also may include a process of removing a terminal corresponding to the specific second quantization length from the receiving terminal list.

In this example it would be inappropriate if the second quantization length $b_i$ were a negative number. As a result, $b_i$, which is independently calculated for the ith receiving terminal, may be determined to be "0," and the ith receiving terminal may be removed from the receiving terminal list $S_n$. A size of the receiving terminal list is represented by $|S_n|$ and is decreased by "1." In operation 530, the second quantization bit $b_i$ may be re-determined with respect to each receiving terminal included in the receiving terminal list $S_n$ according to the updated receiving terminal list $S_n$.

In operation 540, the base station apparatus may transmit a second quantization length corresponding to the receiving terminal to each of the receiving terminals. In operation 550, the base station apparatus may receive, with respect to wireless channels from the base station apparatus to each receiving terminal, the second channel state information that is quantized based on the second quantization length.

In operation 560, the base station apparatus may transmit data to the receiving terminals using a plurality of transmission antennas based on the second channel state information. The second channel state information may include more detailed information about wireless channel state than the first channel state information. In operation 560, based on wireless channel information with more details, the base station apparatus may more effectively transmit data to the receiving terminals.

The operation 560 may further include a process of generating weight vectors based on the second channel state information, a process of generating antenna transmission data by multiplying data to be delivered to the receiving terminals via each of the transmission antennas by each element of the weight vector, and a process of transmitting antenna transmission data to the receiving terminals via each of the transmission antennas.

In operation 560, the weight vectors may be generated based on the second channel state information. The second quantization length may be longer than the first quantization length, and the second channel state information may include more detailed wireless channel information than the first channel state information. In operation 560, the weight vectors may be generated based on the second channel state information including more detailed information.

In operation 560, the weight vectors also may be generated based on the first channel state information and the second channel state information. In operation 560, the first channel state information and the second channel state information may be combined to generate an accurate third channel state information regarding the wireless channel, and the weight vectors are generated based on the third channel state information.

A process of generating the weight vectors may use a Zero-Forcing method or a Minimum Mean Square Error method. When the weight vectors are generated using the Zero-Forcing method, for example, the weight vectors generated for a first receiving terminal may be orthogonal to a direction of the second channel state information transmitted from the second receiving terminal. In the process of generating the weight vectors, weight vectors may be generated so that a weight vector of a specific terminal may be orthogonal to the second channel state information transmitted from another terminal. In such a case, the directional information of a wireless channel vector is more important than the magnitude information of the wireless channel vector in the generating of the weight vectors. In another example, the second channel state may exclusively include the directional information of the wireless channel vector. In this case, since the second channel state information exclusively includes the directional information of the wireless channel vector, a limited feedback bandwidth may be effectively utilized.

Figure 6:
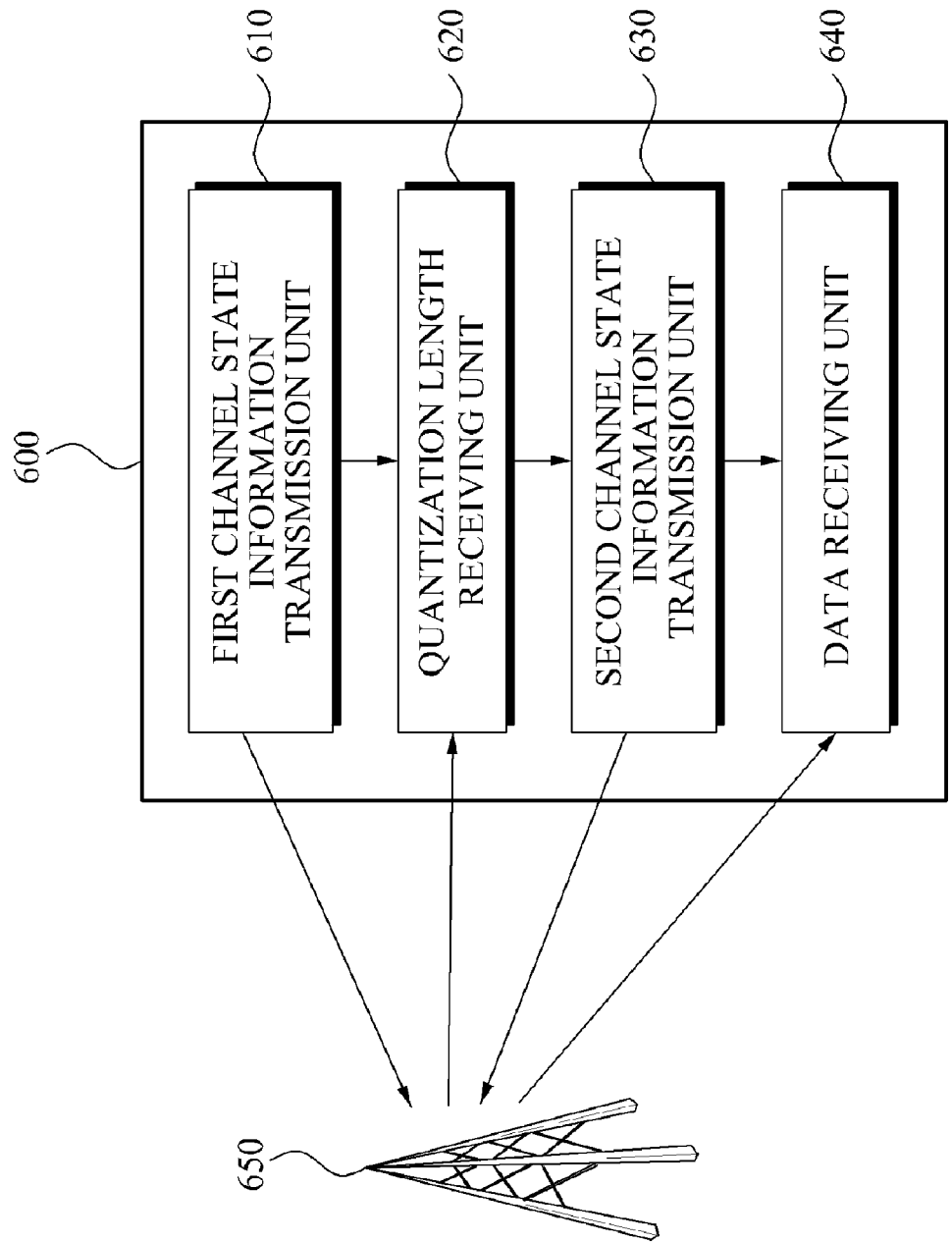
FIG. 6 is a diagram illustrating an exemplary base station.

FIG. 6 is a diagram illustrating an exemplary terminal 600. The terminal 600 may include a first channel state information transmission unit 610, a quantization length receiving unit 620, a second channel state information transmission unit 630, and a data receiving unit 640.

The first channel state information transmission unit 610, with respect to a wireless channel from a base station apparatus 650 to the terminal 600, may transmit a first channel state information, which is quantized based on a first quantization length, to the base station apparatus 650. The first quantization length may be determined to be identical for all other terminals connected to the base station apparatus 650.

The quantization length receiving unit 620 may receive a second quantization length which is determined based on the first channel state information from the base station apparatus 650. The second quantization length may be independently determined for a plurality of receiving terminals connected to the base station apparatus 650.

The second channel state information transmission unit 630, with respect to the wireless channel, may transmit the second channel state information, which is quantized based on the second quantization length, to a base station apparatus 650. Although both the first channel state information and the second channel state information are directed to the same wireless channel, the second channel state information may include more detailed information than the first channel state information. In such a case, the second quantization length may be longer than the first quantization length. The first channel state information and the second channel state information may include magnitude information and directional information with respect to the wireless channel vector.

The data receiving unit 640 may receive data that is transmitted based on the second channel state information. The base station apparatus 650 may generate weight vectors based on the second channel state information and may transmit the data using the weight vectors and the plurality of transmission antennas. The base station apparatus 650 may transmit data to the terminal 600 by either performing beam-forming with respect to data or using a transmission diversity method. The second channel state information may exclusively include the directional information of the wireless channel vector when using the weight vector generating method in the base station apparatus 650.

Figure 7:
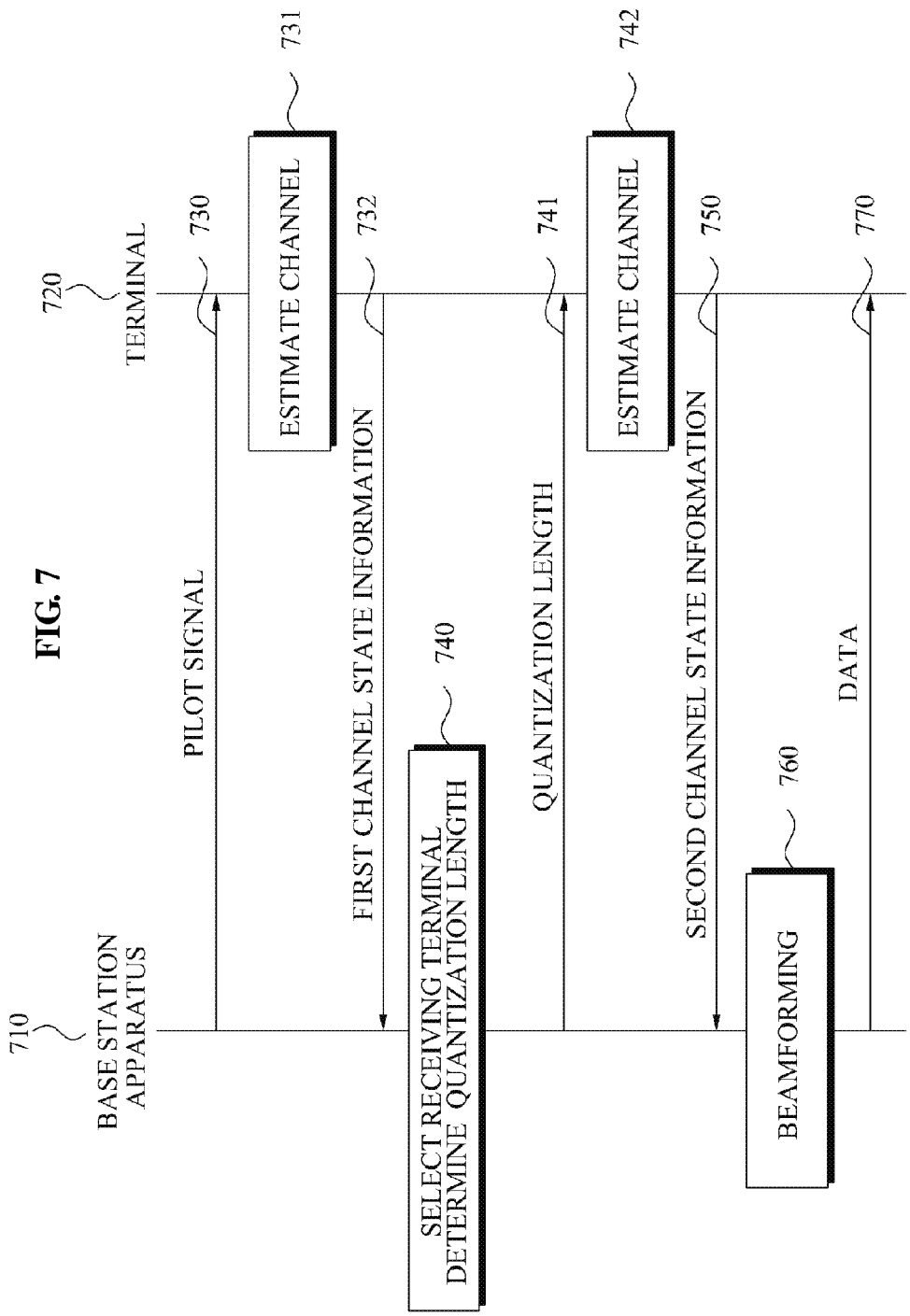
FIG. 7 is a flowchart illustrating an example of transmission of dynamic channel information in a MIMO wireless communication.

FIG. 7 is a flowchart illustrating an exemplary dynamic channel information in a MIMO wireless communication system. In operation 730, a base station apparatus 710 may transmit a plurality of pilot signals to a terminal 720. A pattern which has been prearranged between the base station apparatus 710 and the terminal 720 may be utilized as pilot signals for all signals that the terminal 720 is already aware of. The base station apparatus 710 may include a plurality of transmission antennas and may transmit the plurality of pilot signals to the terminal 720, where each pilot signal is different from another pilot signal with respect to each transmission antenna.

In operation 731, the terminal 720 may estimate a wireless channel from the base station apparatus 710 to the terminal 720 using the plurality of pilot signals. When the base station apparatus 710 uses the plurality of transmission antennas, a channel from the base station apparatus 710 to the terminal 720 is a vector channel. In FIG. 7, for example, the base station apparatus 710 may transmit pilot signals using the plurality of transmission antennas. The terminal 720 may estimate vector channels using a pilot signal corresponding to each transmission antenna.

In operation 732, the terminal 720 may transmit a first channel state information, which is quantized based on a first quantization length, to the base station apparatus 710. The first quantization length may be determined to be identical with respect to all terminals connected to the base station apparatus 710.

In operation 740, the base station apparatus 710 may select a plurality of receiving terminals using the first channel state information. In the MIMO system, a number of terminals capable of effectively receiving data from the base station apparatus 710 is limited. The base station apparatus 710 may select a receiving terminal that will receive data from the base station apparatus 710 based on the number of the transmission antennas of the base station apparatus 710, such as the receiving terminal 720.

Further, in the operation 740, the base station apparatus 710 may independently determine the second quantization length with respect to each receiving terminal 720. In other words, the second quantization length of the first quantization terminal connected to the specific base station apparatus 710 may differ from the second quantization length of the second receiving terminal. The base station apparatus 710 may determine the second quantization length based on a number of transmission antennas of the base station apparatus 710, a number of the terminals connected to the base station apparatus 710, a transmission power of the base station apparatus 710, and the first quantization length.

In operation 741, the base station apparatus 710 may transmit the second quantization length to the receiving terminal 720. In operation 742, the receiving terminal 720 may estimate a wireless channel and may perform quantization according to the second quantization length. In operation 750, the receiving terminal 720 may transmit the second channel information, which is quantized based on the second quantization length, to the base station apparatus 710.

In operation 760, the base station apparatus 710 may generate a weight vector based on the second channel state information. The weight vector may be used for performing beamforming with respect to data. In operation 770, the base station apparatus 710 may transmit data to the receiving terminal 720 using the second channel state information. The base station apparatus 710 may multiply the data by the weight vector and may transmit the result of the multiplication to the receiving terminal 720 via each of the transmission antennas.

The illustrated transmission of dynamic channel information in a MIMO wireless communication system according to an exemplary embodiment, including a data transmission method or a dynamic data transmission method, as described above may be recorded, or fixed in one or more computer-readable media that includes program instructions to be implemented by a computer to cause a processor to execute or perform the program instructions. The media may also include, independent of or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the methods and/or operations described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station apparatus for a base station in a wireless communications system, the base station apparatus comprising:
a first channel state information receiving unit to receive first channel state information from a plurality of terminals regarding a wireless channel between the base station apparatus and the plurality of terminals connected to the base station apparatus, wherein the first channel state information is quantized based on a first quantization length;
a receiving terminal selection unit to select at least one receiving terminal to receive data from among the plurality of terminals based on the first channel state information;
a quantization length determination unit to independently determine a second quantization length of the selected receiving terminal based on the first channel state information;
a quantization length transmission unit to transmit the second quantization length to the selected receiving terminal, wherein the second quantization length corresponds to the selected receiving terminal;
a second channel state information receiving unit to receive the second channel state information from the selected receiving terminal, wherein the second channel state information is quantized based on the second quantization length of the wireless channel; and
a data transmission unit to transmit data to the selected receiving terminal using a plurality of transmission antennas of the base station based on the second channel state information.

2. The base station apparatus of claim 1, wherein:
the terminal selection unit selects a plurality of receiving terminals based on a number of the plurality of transmission antennas,
the quantization length determination unit independently determines the second quantization length of the selected receiving terminals based on the first channel state information;
the quantization length transmission unit transmits the second quantization length to the selected receiving terminals, wherein the second quantization length corresponds to the selected receiving terminals;
the second channel state information receiving unit receives the second channel state information from the selected receiving terminals, wherein the second channel state information is quantized based on the second quantization length of the wireless channel; and
the data transmission unit transmits data to the selected receiving terminals using the plurality of transmission antennas of the base station based on the second channel state information.

3. The base station apparatus of claim 1, wherein the transmission unit comprises:
a weight vector generation unit to generate a weight vector based on the second channel state information;
a transmission data generation unit to generate antenna transmission data by multiplying data to be transmitted to the receiving terminals via each of the plurality of transmission antennas by an element of the weight vector; and
an array transmission unit to transmit the antenna transmission data to the at least one receiving terminal via each transmission antenna.

4. The base station apparatus of claim 3, wherein the weight vector generation unit generates the weight vector based on the first channel state information.

5. The base station apparatus of claim 1, further comprising:
a pilot signal transmission unit to transmit a pilot signal to the selected receiving terminal using each transmission antenna, wherein the first channel state information and the second channel state information are generated based on the pilot signal.

6. The base station apparatus of claim 1, wherein the first channel state information comprises at least one of a magnitude information or a directional information of a channel vector with respect to the wireless channel.

7. The base station apparatus of claim 1, wherein the quantization length determination unit determines the second quantization length based on at least one of:
a feedback bandwidth allocated to the first channel state information or a feedback bandwidth allocated to the second channel state information;
a number of the transmission antennas of the base station apparatus;
a number of the plurality of terminals;
a transmission power of the base station apparatus; and
the first quantization length.

8. The base station apparatus of claim 1, wherein the quantization length determination unit
generates a receiving terminal list which includes an index of the selected receiving terminal; and
determines the second quantization length according to:

$$b_i = \frac{1}{\beta} \log_2 \left\{ \alpha_i \cdot \beta \cdot \left( \frac{1}{v} - \frac{1}{\beta} \right) \right\}$$

wherein $b_i$ is a second quantization length of an ith receiving terminal;
$\alpha_i$ is determined as:

$$\alpha_i = \frac{P}{M} \|h_i\|^2 \cdot 2^{-\frac{\overline{b}}{M-1}}$$

where P is a transmission power of the base station, M is the number of transmission antennas of the base station apparatus, $h_i$ is a wireless channel vector from the transmission antenna of the base station apparatus to the ith receiving terminal, and $\overline{b}$ is a first quantization length;
$\beta$ is determined as:

$$\beta = \frac{1}{M-1};$$

and
v is determined as:

$$v = \left( \left( \frac{2^{\beta \cdot (B - K \cdot \overline{b})}}{\beta^{|S_n|} \cdot \prod_{i \in S_n} \alpha_i} \right)^{1/|S_n|} + \frac{1}{\beta} \right)^{-1}$$

where B is a total sum of the first quantization length and the second quantization length, $S_n$ is a receiving terminal list, and K is the number of the plurality of terminals connected with the base station apparatus.

9. The base station apparatus of claim 1, wherein the second channel state information comprises at least one of magnitude information or directional information of a channel vector with respect to the wireless channel.

10. A terminal comprising:
a first channel state information transmission unit to transmit first channel state information to a base station regarding a wireless channel between the base station and the terminal, wherein the first channel state information is quantized based on a first quantization length;
a quantization length receiving unit to receive a second quantization length from the base station, wherein the second quantization length is determined based on the first channel state information;
a second channel state information transmission unit to transmit a second channel state information of the wireless channel to the base station, wherein the second channel state information is quantized with the second quantization length; and
a data receiving unit to receive data from the base station transmitted based on the second channel state information.

11. The terminal of claim 10, wherein the first channel state information comprises at least one of magnitude information or directional information of a channel vector with respect to the wireless channel.

12. The terminal of claim 10, wherein the second channel state information comprises at least one of magnitude information or directional information of a channel vector with respect to the wireless channel.

13. A data transmission method of transmitting data to wireless terminals from a base station comprising:
receiving a first channel state information from a plurality of terminals regarding a wireless channel between the base station and a plurality of terminals connected to the base station, wherein the first channel state information is quantized based on a first quantization length;
selecting, by the base station, at least one of receiving terminals to receive data from among the plurality of terminals based on the first channel state information;
independently determining, by the base station, a second quantization length of the receiving terminals based on the first channel state information;
transmitting from the base station to the receiving terminals the second quantization length which corresponds to the receiving terminals;
receiving, by the base station, the second channel state information from the receiving terminals, wherein the second channel state information is quantized into the second quantization length of the wireless channel; and
transmitting data from the base station to the receiving terminals using a plurality of transmission antennas based on the second channel state information.

14. The method of claim 13, wherein the selecting, by the base station, at least one of receiving terminals:
selects a plurality of receiving terminals based on a number of the plurality of transmission antennas;
independently determining, by the base station, a second quantization length of the receiving terminals based on the first channel state information;
transmitting from the base station to the receiving terminals the second quantization length which corresponds to the receiving terminals;
receiving, by the base station, the second channel state information from the receiving terminals, wherein the second channel state information is quantized into the second quantization length of the wireless channel; and
transmitting data from the base station to the receiving terminals using a plurality of transmission antennas based on the second channel state information.

15. The method of claim 13, wherein the transmitting of the data comprises:
generating, by a weight vector generation unit, a weight vector based on the second channel state information;
generating, by a transmission data generation unit, antenna transmission data by multiplying data to be transmitted to the at least one receiving terminals via each of the plurality of transmission antennas by an element of the weight vector; and
transmitting, by an array transmission unit, the antenna transmission data to the receiving terminals via each transmission antenna.

16. The method of claim 15, wherein the generating the weight vector includes generating the weight vector based on the first channel state information.

17. The method of claim 13, wherein independently determining the second quantization length includes determining the second quantization length based on at least one of a feedback bandwidth allocated to the first channel state information or a feedback bandwidth allocated to the second channel state information, the number of transmission antennas of the base station, the number of the plurality of terminals, a transmission power of the base station, and the first quantization length.

18. The method of claim 13, further comprising:
generating, by a quantization length determination unit, a receiving terminal list that includes an index of the receiving terminals and determines a slack variable v according to:

$$v = \left(\left(\frac{2^{\beta \cdot (B - K \cdot \bar{b})}}{\beta^{|S_n|} \cdot \prod_{i \in S_n} \alpha_i}\right)^{1/|S_n|} + \frac{1}{\beta}\right)^{-1}$$

where B is a total sum of a first quantization length and a second quantization length, $S_n$ is the receiving terminal list, K is a number of the plurality of terminals connected with the base station, and $\bar{b}$ is the first quantization length, $\alpha_i$ is determined as:

$$\alpha_i = \frac{P}{M} \|h_i\|^2 \cdot 2^{-\frac{\bar{b}}{M-1}}$$

where P is a transmission power of the base station, M is a number of transmission antennas of the base station, $h_i$ is a wireless channel vector from the transmission antennas of the base station to an ith receiving terminal, $\beta$ is determined as:

$$\beta = \frac{1}{M-1}$$

wherein independently determining the second quantization length includes determining the second quantization length according to:

$$b_i = \frac{1}{\beta} \log_2 \left\{\alpha_i \cdot \beta \cdot \left(\frac{1}{v} - \frac{1}{\beta}\right)\right\}$$

where $b_i$ is the second quantization length of the ith receiving terminal.

19. The method of claim 18, further comprising:
determining a specific second quantization length as "0" when the specific second quantization length is equal to or less than "0" from among the independently determined second quantization lengths; and
removing a receiving terminal which corresponds to the predetermined second quantization length from the receiving terminal list.

20. A non-transitory computer-readable recording medium storing a program configured to cause a base station to:
receive a first channel state information from a plurality of terminals of a wireless channel from the base station to a plurality of terminals connected to the base station, wherein the first channel state information is quantized based on a first quantization length;
select at least one receiving terminal to receive data from among the plurality of terminals based on the first channel state information;
independently determine a second quantization length of the selected receiving terminal based on the first channel state information;
transmit from the base station to the selected receiving terminal the second quantization length which corresponds to the selected receiving terminal;
receive the second channel state information from the receiving terminals, wherein the second channel state information is quantized into the second quantization length of the wireless channel; and
transmit data from the base station to the selected receiving terminal using a plurality of transmission antennas based on the second channel state information.

21. A base station comprising:
a receiver configured to receive, from each of a plurality of terminals, first channel state information quantized by the plurality of terminals based on a first quantization length;
a selection unit configured to select a group of terminals to receive data from among the plurality of terminals based on the first channel state information;
a determination unit configured to determine a second quantization length of each respective selected receiving terminal from the group of terminals based on the first channel state information; and
a transmitter configured to transmit the determined second quantization length to each selected receiving terminal, respectively.

22. The base station of claim 21, wherein the receiver is further configured to receive second channel state information from each selected receiving terminal, and the second channel state information is quantized by each selected receiving terminal based on the second quantization length determined and transmitted by the base station.

23. The base station of claim 21, wherein the quantization length determination unit is configured to determine a second quantization length of a first selected receiving terminal to be greater than a second quantization length of a second selected receiving terminal.

24. The base station of claim 21, wherein the determination unit determines the second quantization length of each respective selected receiving terminal such that the sum of the second quantization lengths of the group of selected receiving terminals is equal to the sum of the first quantization lengths of the plurality of terminals.

25. The base station of claim 21, wherein the determination unit determines the second quantization length of each respective selected receiving terminal such that the sum of the second quantization lengths of the group of selected receiving terminals is less than the sum of the first quantization lengths of the plurality of terminals.

26. The base station of claim 21, wherein the group of terminals selected by the selection unit excludes at least one terminal from among the plurality of terminals.

27. The base station of claim 22, wherein the second quantization length is greater than the first quantization length, and the second channel state information contains more channel state data than the first channel state information.

* * * * *